United States Patent [19]
Ungerer et al.

[11] Patent Number: 6,123,276
[45] Date of Patent: Sep. 26, 2000

[54] INTERLOCK SYSTEM FOR SPREADER BODIES

[75] Inventors: Glenn Ungerer, Swisher; Timothy Ray Schenk, Manchester, both of Iowa

[73] Assignee: Henderson Manufacturing Company, Manchester, Iowa

[21] Appl. No.: 09/412,454

[22] Filed: Oct. 4, 1999

[51] Int. Cl.[7] ................................................. A01C 19/00
[52] U.S. Cl. ............................................ 239/675; 239/684
[58] Field of Search .................................. 239/672, 675, 239/676, 684

[56] References Cited

U.S. PATENT DOCUMENTS

| | | | |
|---|---|---|---|
| 3,235,107 | 2/1966 | Tift | 239/675 |
| 3,322,429 | 5/1967 | Cervelli | 239/675 |
| 4,234,109 | 11/1980 | Goodhart | 239/675 |
| 5,501,404 | 3/1996 | Meyer et al. | 239/676 |
| 5,860,604 | 1/1999 | Kooiker | 239/672 |
| 5,988,535 | 12/1999 | Kime | 239/684 |

*Primary Examiner*—Andres Kashnikow
*Assistant Examiner*—Dinh Q. Nguyen
*Attorney, Agent, or Firm*—Leydig, Voit & Mayer, Ltd.

[57] ABSTRACT

Systems for reducing the possibility of inadvertent activation of an auger located in a supply body and/or spreader device while the covers of such a body or spreader device are open are provided. A motor that is drivingly connected to the auger is provided, as is a power supply for the motor that includes first and second engageable couplings. An arm located adjacent the spreader device is included, and is movable between a position that prevents opening of the cover and a position that permits opening of the cover. The first coupling is located with respect to the arm so that the first and second couplings may be engaged only when the arm is in a position that prevents the cover from opening. The cover can only be opened when the first and second couplings are separated, thereby interrupting the power supply to the motor and preventing operation of the auger.

15 Claims, 4 Drawing Sheets

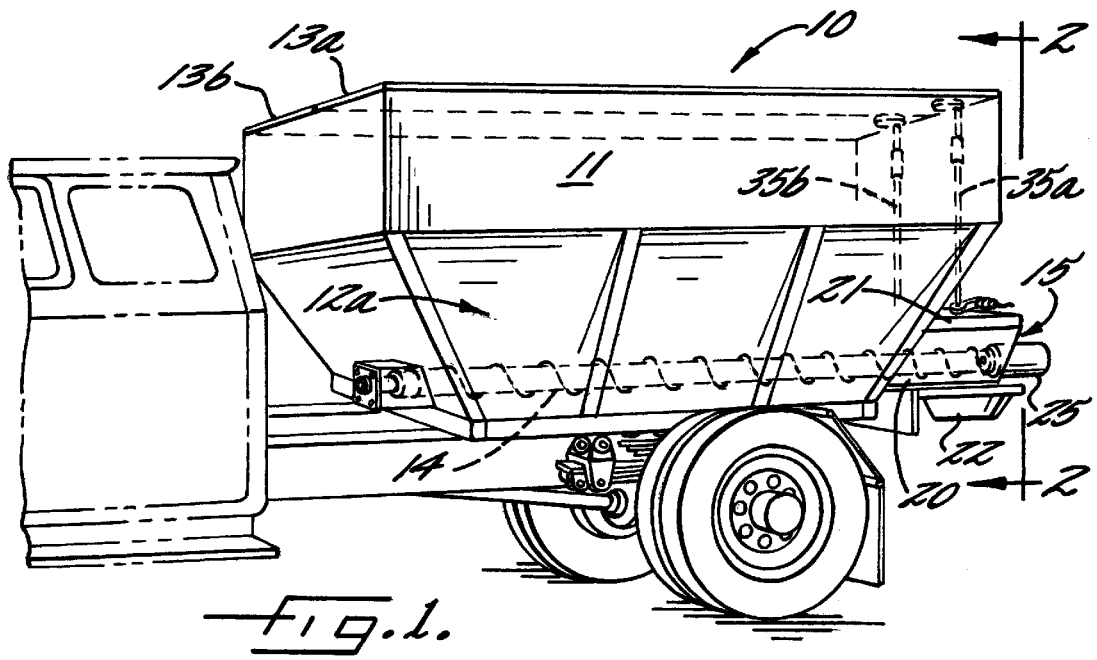
Fig. 1.
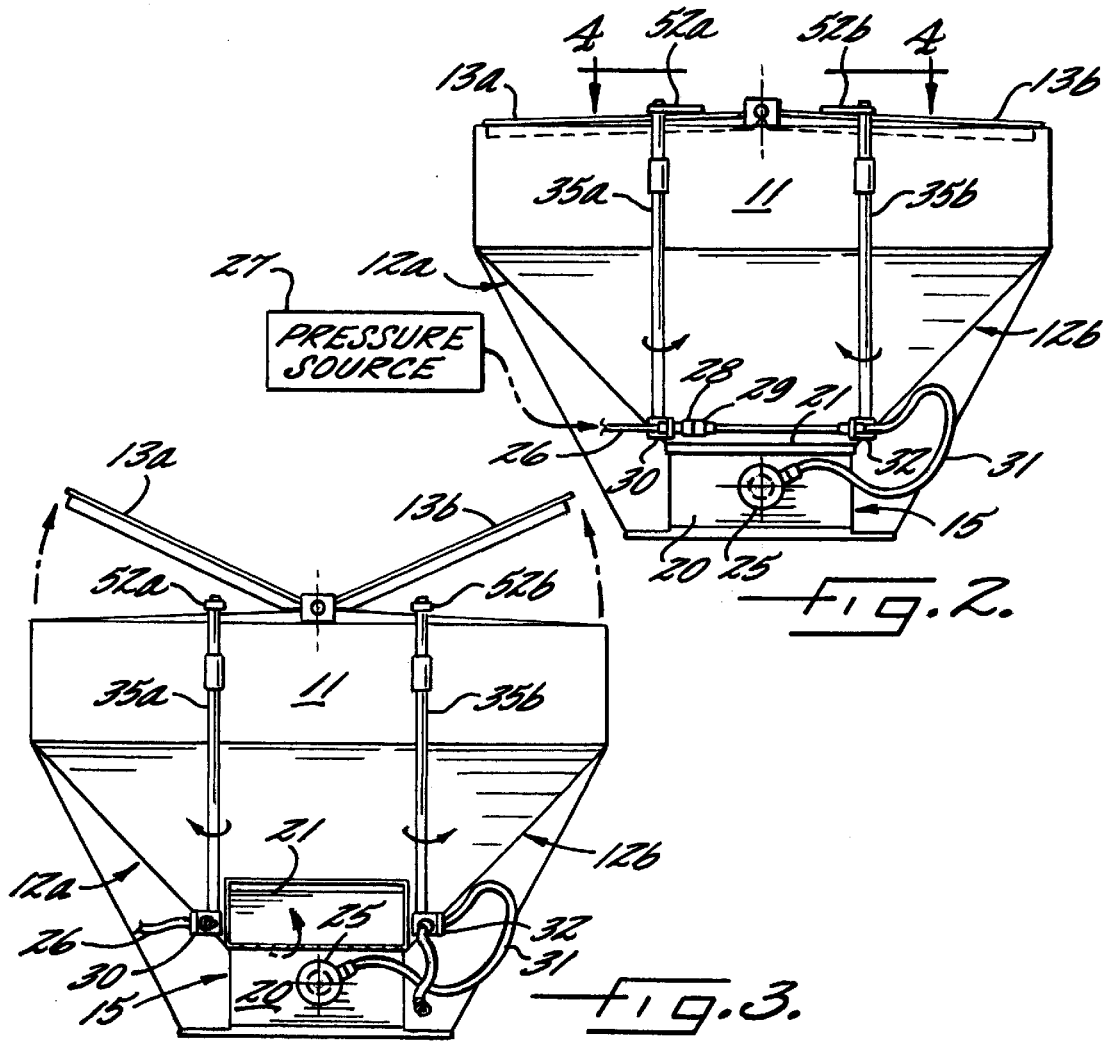
Fig. 2.
Fig. 3.

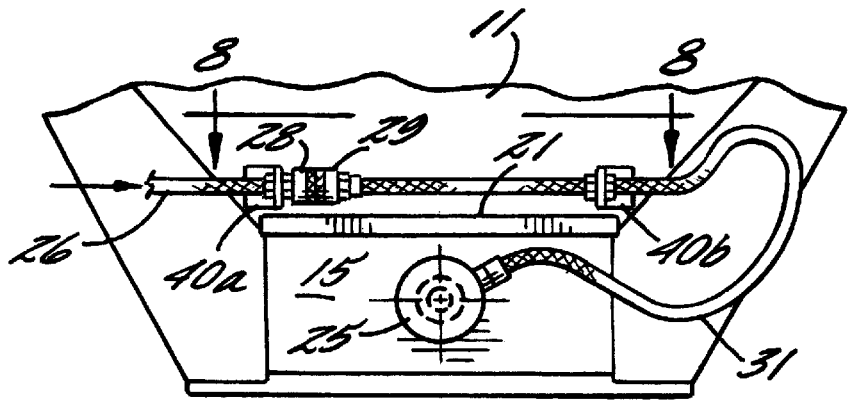
_fig. 7._
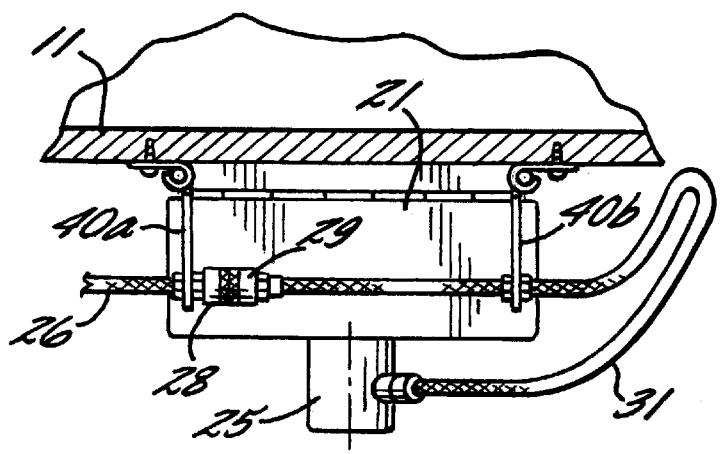
_fig. 8A._
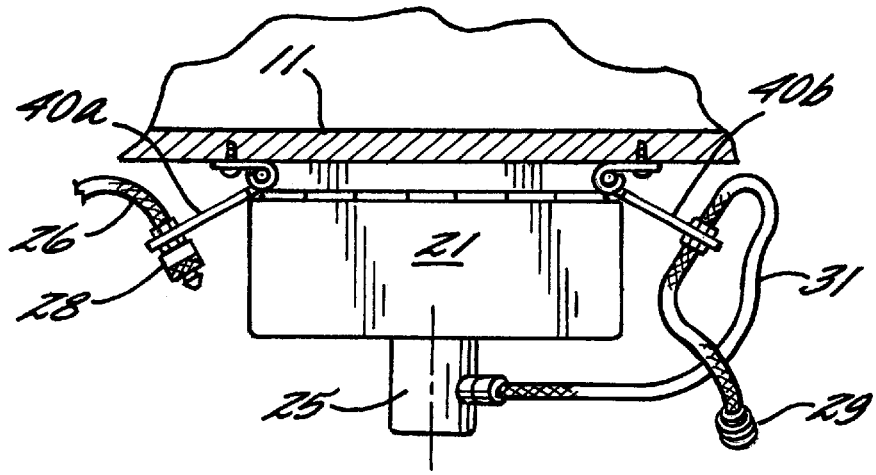
_fig. 8B._

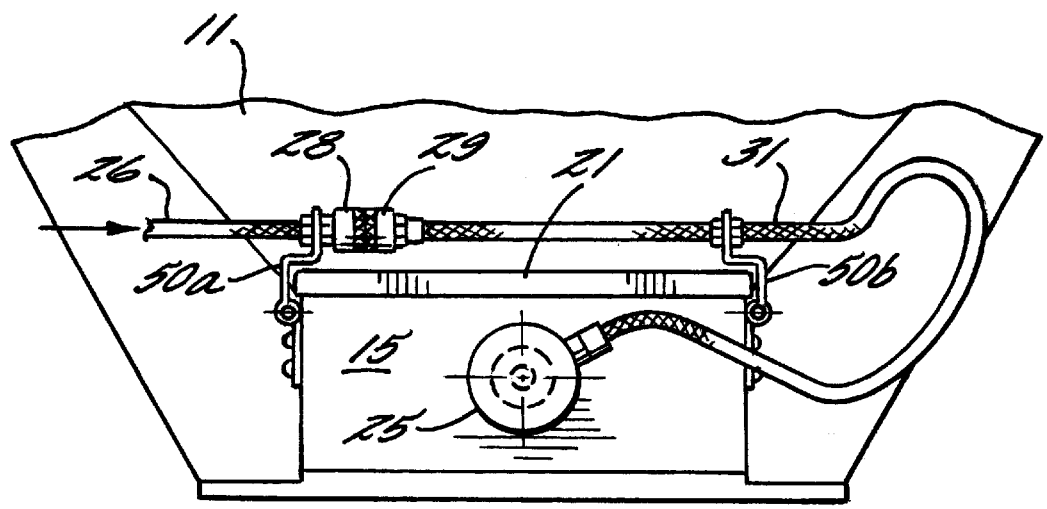
_Fig. 9A._
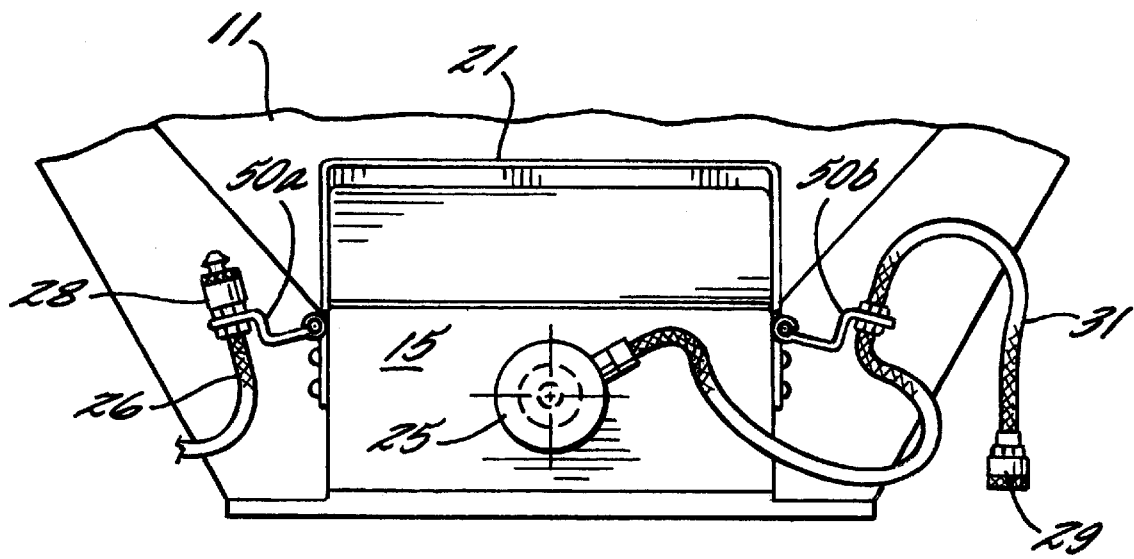
_Fig. 9B._

INTERLOCK SYSTEM FOR SPREADER BODIES

FIELD OF THE INVENTION

The present invention relates to spreader devices used in combination with material supply bodies, e.g., V-Box spreader bodies, which include an auger or other type of conveying mechanism to move particulate material within the supply body and spreader, thereby assisting in the distribution of particulate matter onto a surface, such as salt or sand onto a roadway.

BACKGROUND OF THE INVENTION

The distribution of particulate material onto surfaces, such as salt or sand onto roadways and fertilizer onto fields, is commonly provided by use of a chassismounted particulate supply body and associated spreader device. One popular form of supply body is commonly referred to as a V-Box. V-Box bodies are open at the top to receive particulate material therein and have, as their name implies, straight, downwardly sloped sides, generally in the shape of a "V." These sloping sides function to direct the particulate material toward the lower center of the body.

The particulate material is loaded into the V-Box through the open top portion. The open top portion of the V-Box is commonly covered by at least one screen. The screen allows the material to flow into the V-Box, but prevents personnel from entering the V-Box. A V-Box will commonly have at least two screens, with each screen being pivotally mounted to the V-Box along its longitudinal centerline.

A conveyor, such as an auger, is also provided in the lower portion of the V-box. The auger extends from the front of the V-Box to at least the rear of the V-Box, and typically beyond the rear of the V-Box. The auger functions to move the material to the rear of the V-Box, and typically extends into a spreader device located at the rear of the V-Box to ensure movement of desired quantities of particulate material from the V-Box into the spreader device.

The spreader device, located at the rear of the V-Box, includes a hopper having an inlet that receives particulate material from the V-Box and an outlet to distribute the particulates. An auger is also located in the lower portion of the hopper to move the particulates within the spreader device, and a pivotable cover is provided on the upper portion of the hopper to prevent access to the interior of the hopper. The auger in the spreader body is typically the rearward extending portion of the same auger that is located in the supply body, but may also be a second, separate, auger. A spinner is often located under the outlet of the spreader to scatter the particulate material across the surface over which the spreader travels.

To perform maintenance or clean up, the spreader cover and V-Box screens are sometimes opened. This exposes personnel to the auger. Further, because power is available to the motor that drives the auger when the covers are opened, there exists a possibility that the auger would inadvertently be activated while the personnel were in contact with the auger.

A system is therefore required to reduce the possibility of inadvertent activation of the auger when the spreader cover or supply body screens are opened. Such systems must further be reliable in a corrosive environment, be relatively easy to use in harsh environmental conditions, and be relatively difficult to disable or circumvent.

SUMMARY OR THE INVENTION

The present invention meets the foregoing and other needs by providing, in one aspect, a system for reducing the possibility of inadvertent activation of an auger in a spreader device while the cover of such a spreader device is open.

This system includes several components. A supply body configured to hold particulates, and a spreader located adjacent the supply body are provided. The spreader includes an inlet for accepting particulates from the supply body and an outlet for distributing the particulates. The spreader further includes an open upper portion and a lower portion, with an auger being located in the lower portion of the spreader, and a cover movably mounted on the spreader to cover the open upper portion of the spreader. A motor that is drivingly connected to the auger is provided, as is a power supply for the motor that includes first and second engageable couplings. An arm located adjacent the spreader device is included, and is movable between a position that prevents opening of the cover and a position that permits opening of the cover. The first coupling is located with respect to the arm so that the first and second couplings may be engaged only when the arm is in a position that prevents the cover from opening. The cover can only be opened when the first and second couplings are separated, thereby interrupting the power supply to the motor and preventing operation of the auger.

In a second aspect of the present invention, a system is provided for reducing the possibility of inadvertent activation of an auger in a supply body while the screens of such a supply body are open. This system includes a supply body comprising an open upper portion and a lower portion, and a conveyor located in the lower portion of the supply body. A cover, e.g., screen or solid sheet, is movably mounted on the supply body so as to cover at least a portion of the open upper portion of the body. A motor drivingly connected to the conveyor is provided, as is a power supply for the motor. The power supply includes first and second engageable couplings. An arm is provided that includes a strut that is movable between a position that prevents opening of the cover and a position that permits opening of the cover, wherein the first coupling is located with respect to the arm so that the first and second couplings may be engaged only when the strut is in a position that prevents the cover from opening. The cover can thus only be opened when the first and second couplings are separated, thereby interrupting the power supply to the motor and preventing operation of the conveyor.

The foregoing aspects may advantageously be used in combination, if desired.

BRIEF DESCRIPTION OF THE DRAWINGS

FIG. 1 is a perspective view of one embodiment of the systems of the present invention, illustrating a V-Box and spreader mounted onto a truck chassis, and showing this embodiment with the spreader cover and optional V-Box screens in their closed positions;

FIG. 2 is a rear view of a system of the present invention taken along section 2—2 of FIG. 1, illustrating the spreader cover and optional V-Box screens in closed positions;

FIG. 3 is a rear view of a system of the present invention shown in FIG. 2, illustrating the spreader cover and optional V-Box screens in open positions;

FIG. 7 is a partial rear view of an embodiment of the system of the present invention wherein the arms are attached to the supply body and are in a position to prevent opening of the spreader cover;

FIG. 8A is a partial top view of an embodiment of the system of the present invention taken along section line 8—8 of FIG. 7 wherein the arms are attached to the supply body and are oriented in a position to prevent opening of the spreader cover;

FIG. 8B is a partial top view of an embodiment of the system of the present invention taken along section line 8—8 of FIG. 7 wherein the arms are attached to the supply body and are oriented in a position to permit opening of the spreader cover;

FIG. 9A is a partial rear view of an embodiment of the system of the present invention wherein the arms are attached to the spreader and are in a position to prevent opening of the spreader cover; and FIG. 9B is a partial rear view of an embodiment of the system of the present invention wherein the arms are attached to the spreader and are in a position to permit opening of the spreader cover, as shown.

Figure 4A:
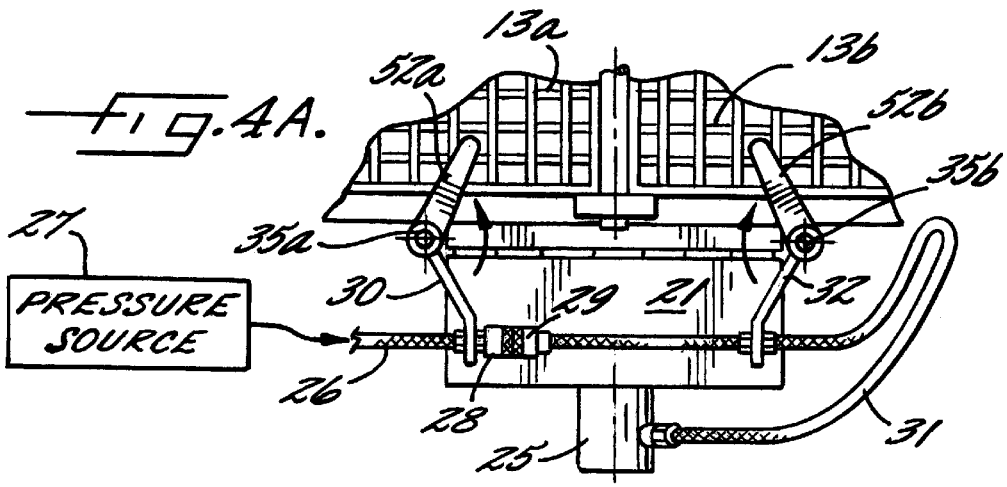
FIG. 4A is a partial top view of a system of the present invention taken along section 4—4 of FIG. 2, illustrating the interaction between the arms, spreader cover, screen covers and couplings when positioned to prevent opening of the spreader cover and screens.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

Unless specifically indicated to the contrary, use of a singular pronoun in connection with a particular component of the invention described and claimed herein should not be interpreted as limiting the invention to only one such component; more than one such component may be included.

DETAILED DESCRIPTION OF THE PREFERRED EMBODIMENTS

The foregoing and other features and advantages of the aspects of the present invention will be more readily apparent upon reading the following description of preferred exemplified embodiments of the invention and upon reference to the accompanying drawings.

One aspect of the present invention provides an apparatus for ensuring that the power supply to the auger of the spreader device is disconnected before the spreader cover is opened. Another aspect of the present invention provides a similar apparatus for use in connection with the supply body. Specifically, an apparatus is provided that ensures the power supply to the supply body conveyor is disconnected before the body cover is opened.

Generally, and with respect to the first aspect, an interaction between an arm and the power supply provide the aforesaid and other advantages with respect to the spreader device. Specifically, an arm located adjacent the spreader device is movable between a position that prevents opening of the spreader cover and a position that permits opening of the cover. The power supply to the motor that drives the auger located in the spreader includes first and second couplings, with the first coupling being located with respect to the arm so that the first and second couplings may be engaged only when the arm is in a position that prevents the cover from opening. Conversely, the inventive assembly permits the cover to be opened only when the first and second couplings are separated, thereby interrupting the power supply to the motor and preventing operation of the auger. These aspects of the present invention can be realized by resort to various physical embodiments. The preferred embodiments are disclosed and described herein.

Referring initially to FIG. 1, a conventional truck-mounted supply body and spreader device combination 10 is depicted, with embodiments of the systems of the present invention mounted thereon. As will be appreciated, the inventive systems are universal in that they are readily adaptable to a wide variety of supply body and spreader designs and configurations, and may be integrated into the same at the factory or applied onto older body and spreader designs in the form of retrofit kits. In this figure and other figures, the spreader device is shown as mounted onto the supply body, although the spreader device may be mounted onto the truck chassis, if desired.

Although the supply body 11 may be of any configuration, the particular supply body depicted in FIG. 1 is commonly referred to as a V-Box. V-Box bodies are open at the top to receive particulate material therein and have, as their name implies, straight, downwardly sloped angled sides 12a, 12b. These sloping sides function to direct the particulate material toward the lower center of the body.

Particulate material is loaded into the V-Box through the open top portion, which portion is depicted in the figures as having an optional cover in the form of screens 13a, 13b installed. A conveyor, such as an auger (shown in phantom) 14, is also provided in the lower portion of the V-Box. The auger 14 extends from the front of the V-Box to at least the rear of the V-Box, and typically (as illustrated) beyond the rear of the V-Box. The auger 14 functions to move the material to the rear of the V-Box. The auger 14 will typically extend into the spreader device located at the rear of the V-Box (as illustrated) to ensure movement of desired quantities of particulate material from the V-Box 11 into the spreader device 15, as well as within the spreader device itself. Alternatively, a second, separate conveyor or auger may be provided in the spreader device.

The spreader device 15, located at the rear of the V-Box, includes a hopper having an inlet that receives particulate material from the V-Box and an outlet to distribute the material. A pivotable cover 21 is also provided on the upper portion of the hopper to prevent undesired access to the interior of the hopper. A spinner 22 is often located under the outlet of the spreader to scatter the particulate material across the surface over which the spreader travels.

A motor 25 is provided to drive the auger. The motor is preferably hydraulic, although other types of motors could also be used. As shown in the preferred embodiment, a first pressure line 26 that powers the hydraulic motor 25 runs from a pressure source 27, through a control valve (not shown), and terminates prior to the motor at a first coupling 28.

Figure 4B:
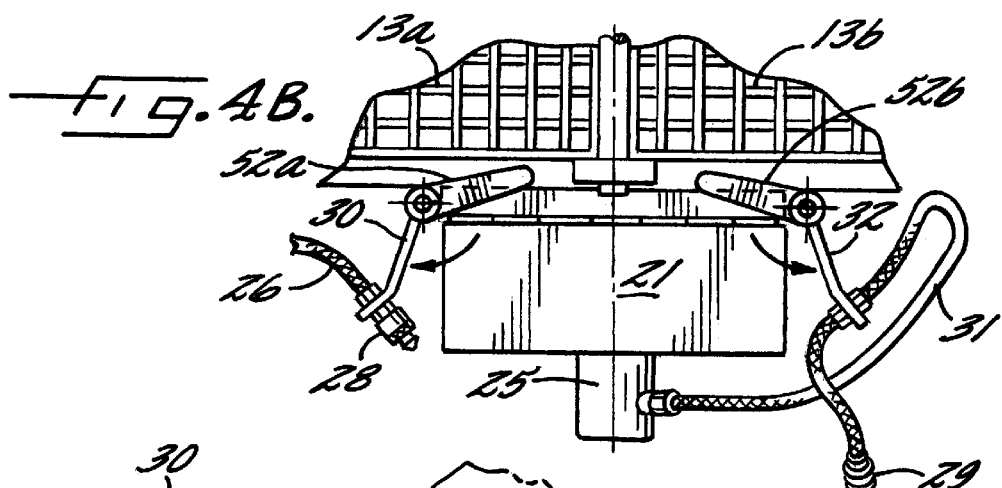
FIG. 4B is a partial top view of a system of the present invention taken along section 4—4 of FIG. 2, illustrating the interaction between the arms, spreader cover, screen covers and couplings when positioned to permit opening of the spreader cover and screens.

In one embodiment, as best depicted in FIG. 4A, the first coupling 28 is mounted onto a movable arm 30. A second pressure line 31 runs from the motor 25, is affixed onto a second movable arm 32, and terminates at a second coupling 29. Moving to FIG. 2, each arm 30, 32 is mounted adjacent the spreader device, in this embodiment on a rotatable shaft 35a, 35b which is mounted onto the supply body, with the shaft and arm being located and configured so as to prevent the spreader cover 21 from being opened when the first and second couplings 28, 29 are connected. Thus, it is only when the first and second couplings are disconnected (as shown in FIG. 4B, and in more detail in FIG. 5), and the auger power supply is interrupted, that the cover 21 may be opened.

An alternative embodiment of the movable arm is depicted in FIG. 7. In this embodiment, there is at least one 40a, and preferably two 40b, movable arm in the form of a two-flap hinge. One of the couplings 28 is attached to the flap of one hinge 40a, with the pressure line 31 passing through a flap of the second hinge 40b. The flaps of each arm not in contact with the coupling or pressure line are affixed to the supply body 11, allowing the non-affixed flaps to freely rotate about their respective hinge axis. The two-flap hinges of this embodiment are located and configured to prevent the spreader cover 21 from being opened when the first and second couplings 28, 29 are connected (see, e.g., FIG. 8A). Again, it is only when the first and second couplings are disconnected, and the hinges rotated toward the supply body (as shown in FIG. 8B), that the cover 21 may be opened.

It should be appreciated that the arms could be located farther from one another and not over the cover in either of the embodiments depicted in FIGS. 7, 8A and 8B (as depicted in phantom in FIG. 7), so that the portion of the pressure line 31 located therebetween will prevent the cover 21 from opening when the first and second couplings 28, 29 are engaged.

Another alternative embodiment of the movable arm is depicted in FIG. 9A. In this embodiment, at least one movable arm 50a in the form of a two-flap hinge, with one flap mounted on the side of the spreader device itself. The second hinge flap extend upward, with a coupling being affixed thereto. A second arm 50b, movable or immovable, may be provided on the opposite sidewall of the spreader device 15, with the pressure line 31 passing through this second arm. As illustrated, one flap of each arm is configured to prevent the cover 21 from opening when the first and second couplings 28, 29 are connected to one another. As before (shown in FIG. 9B), when the first and second couplings 28, 29 are disconnected, each arm 50a, 50b may be pivoted away from the cover 21, allowing the cover to be opened. Alternatively, it should be appreciated that both arms may be fixed in position (i.e., without a hinge) and the cover width diminished so that the cover can be opened without interference from the arms or couplings after the couplings are disconnected (see FIG. 9A which illustrates in phantom a cover of diminished width).

It should be further appreciated that, in each of the exemplary configurations described herein, a single arm may be used to the same effect, with only one of the couplings being affixed to that arm. If such an alternative embodiment is used, the length of the pressure line should be limited so the arm cannot move (if movable, or if not movable that allows the pressure line to be moved from an interfering position) into a position that permits the cover to be opened when the first and second couplings are connected.

Figure 5:
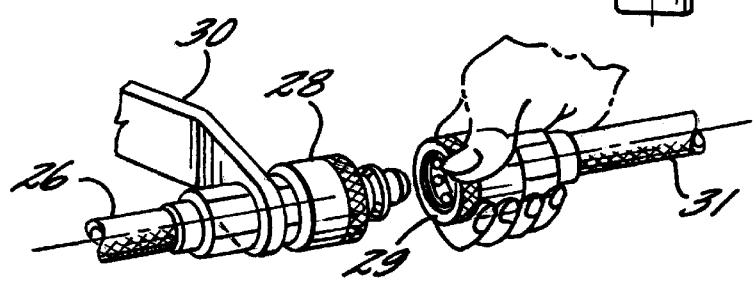
FIG. 5 illustrates preferred quick connect-disconnect couplings useful in the various systems of the present invention.

The couplings 28, 29 may be of any type suitable for the particular motor power source being utilized, as are well known. Advantageously, the couplings are the quick-connect-disconnect type, as depicted in FIG. 5, which permit ease of manipulation in severe weather conditions, e.g., ice, rain, snow and the like.

A related aspect of the present invention concerns pivotable screens that are provided on many supply bodies, e.g., V-Box bodies. This aspect of the invention provides a system that permits these screens to be opened only after the power supply to the motor driving the conveyor mechanism, e.g., auger, in the supply body has been interrupted. While this system can be used alone, it is preferably used in combination with the system for preventing opening of the spreader cover described previously.

Turning initially to FIG. 2, there is depicted one embodiment of a system for preventing opening of the supply body screens 13a, 13b. This system includes an arm 30 that further includes a rotatable shaft 35a and strut 52a, wherein the strut 52a is movable between a position that prevents opening of the screen and a position that allows opening of the screen. Preferably, a second arm 32 including a rotatable shaft 35b and strut 52b is also provided. As shown in FIG. 4A, one of the couplings 28 is affixed to an arm 30 so that the first and second couplings 28, 29 may be engaged only when the strut 52a is in a position that prevents the screen 13b adjacent the strut 52a from opening. After the first and second couplings 28, 29 are disengaged (as shown in FIG. 4B), the shaft, and therefore the strut 52b, is free to rotate into a position when the strut 52b no longer interferes with the opening of the screen 13a.

As shown in FIGS. 2, 3, 4A and 4B, when the cover and screen systems are used in combination, the portion of the arm that prevents the spreader cover from opening 30, 32 and the struts 52a, 52b should be oriented with respect to one another so that, when the couplings are disengaged, rotation of the shaft will permit both the cover 21 and screens 13a, 13b to be opened.

Figure 6:
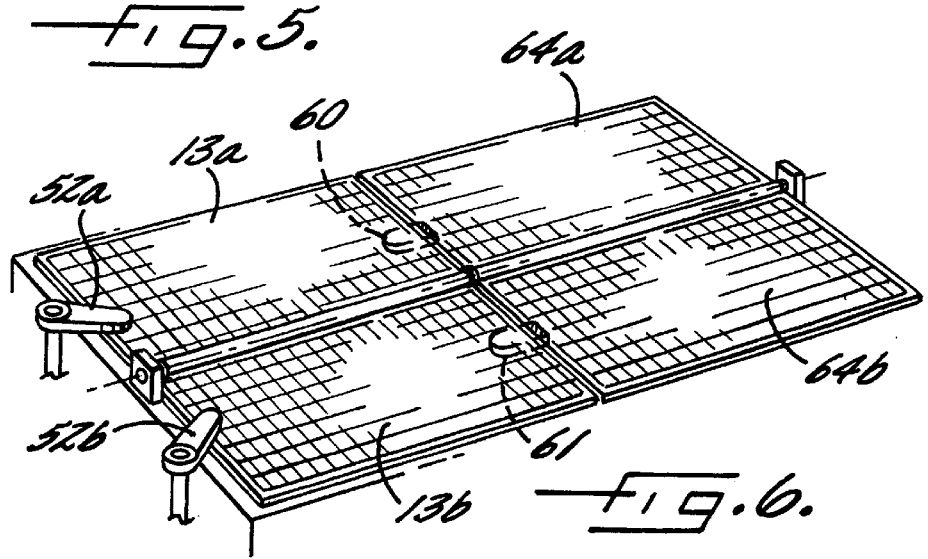
FIG. 6 is a top perspective view of a system of the present invention illustrating two sets of V-Box screens, with protrusions positioned on the second set of screens to prevent the second set of screens from opening until the first set of screens is opened.

A further aspect of the present invention is provided when a plurality of screens is used to cover the supply body. In such a situation, and referring to FIG. 6, at least one interfering tab 60, 61 or other like protrusion is provided on at least one set of screens. These tabs 60, 61 are located to prevent inadvertent opening of screens 64a, 64b other than those that directly contact the interfering strut 52a, 52b. In other words, an operator is precluded from opening a second screen, e.g., 64a, until the first screen, e.g., 13a, has been opened. Of course, the first screen 13a is subject to the system, and is prevented from opening by the strut 52b.

While the present invention is described herein as preventing or hindering the opening of the cover or screens, it is possible to have some minor opening of these components while still meeting the meets and bounds of the present invention. Any opening of these components beyond a few inches while the couplings remain connected will reduce the advantages offered by the present invention.

Further, the shape and type of supply body is not critical to the present invention, and may include curved or straight sides to assist in directing the particulate material therein to the lower portion of the body. The body can similarly be of any conventional design, e.g., a combination dump and spreader body, dump or fixed body, but again is preferably what is commonly referred to as a V-Box body.

The present invention provides novel and improved systems for reducing the possibility of inadvertent activation of an auger in a supply body and spreader device while the covers of the body and/or device are open which meets the aforementioned and other needs. Various additional modifications of the embodiments specifically illustrated and described herein not specifically mentioned herein will be apparent to those skilled in the art, particularly in light of the teachings of this invention. Thus, the invention should not be construed as limited to the specific forms shown and described, but instead as set forth in the following claims.

What is claimed is:

1. A system for preventing undesired opening of a cover movably mounted on a spreader during operation of an auger located within the spreader comprising a supply body configured to hold particulates, a spreader located adjacent the supply body and comprising an inlet for accepting particulates from the supply body and an outlet for distributing the particulates, the spreader further comprising an open upper portion and a lower portion, an auger located in the lower portion of the spreader, a motor drivingly connected to the auger, a cover movably mounted on the spreader that covers at least a portion of the open upper portion of the spreader, a power supply for the motor which includes first and second engageable couplings, and an arm adjacent to the spreader device movable between a position that prevents opening of the cover and a position that permits opening of the cover, the first coupling being located with respect to the arm so that the first and second couplings may be engaged only when the arm is in a position that prevents the cover from opening, wherein the cover can only be opened when the first and second couplings are separated, thereby interrupting the power supply to the motor and preventing operation of the auger.

2. The system according to claim 1, wherein the supply body is a V-Box.

3. The system according to claim 1, wherein the movable arm is mounted onto the supply body.

4. The system according to claim 3, wherein the movable arm comprises a rotatable shaft.

5. The system according to claim 1, further comprising a second arm adjacent to the spreader device movable between a position that prevents opening of the cover and a position that permits opening of the cover, wherein a portion of the power supply that is attached to the second coupling is attached to the second arm.

6. A system for preventing undesired opening of a cover movably mounted on a supply body during operation of a conveyor located within the supply body comprising a supply body comprising an open upper portion and a lower portion, a conveyor located in the lower portion of the supply body, a motor drivingly connected to the conveyor, a cover movably mounted on the supply body that covers at least a portion of the open upper portion of the supply body, a power supply for the motor which includes first and second engageable couplings, and an arm including a strut movable between a position that prevents opening of the cover and a position that allows opening of the cover, the first coupling being located with respect to the arm so that the first and second couplings may be engaged only when the strut is in a position that prevents the cover from opening, wherein the cover can only be opened when the first and second couplings are separated, thereby interrupting the power supply to the motor and preventing operation of the conveyor.

7. The system according to claim 6, wherein the conveyor is an auger.

8. The system according to claim 6, wherein the spreader body is a V-Box.

9. The system according to claim 6, wherein the cover is a screen.

10. The system according to claim 6, wherein the first coupling is mounted onto the arm.

11. The system according to claim 6, further comprising a second cover pivotally mounted on the supply body that includes a tab, the tab being positioned so that the first cover must be opened prior to opening the second cover.

12. The system according to claim 11, wherein the second cover is a screen.

13. A system for preventing undesired opening of a cover movably mounted on a spreader and a cover movably mounted on a supply body during operation of an auger located within the spreader and supply body comprising a supply body open at its upper end and configured to hold particulates, a cover movably mounted on the supply body that covers at least a portion of the open upper portion of the supply body, a spreader located adjacent the supply body and comprising an inlet for accepting particulates from the supply body and an outlet for distributing the particulates, the spreader further comprising an open upper portion and a lower portion, a cover movably mounted on the spreader that covers at least a portion of the open upper portion of the spreader, an auger located in the lower portion of the spreader, a motor drivingly connected to the auger, a power supply for the motor which includes first and second engageable couplings, and an arm movable between a position that prevents opening of the spreader cover and a position that permits opening of the spreader cover, the arm including a strut that moves in coordination with the arm between a position that prevents opening of the body cover and a position that permits opening of the body cover, the first coupling being located and oriented with respect to the arm and strut so that the first and second couplings may be engaged only when the arm and strut are in a position that prevents the spreader and body covers from opening, wherein the spreader and body covers can only be opened when the first and second couplings are separated, thereby interrupting the power supply to the motor and preventing operation of the auger.

14. The system according to claim 13, further comprising a second cover pivotally mounted on the supply body that includes a tab, the tab being positioned so that the first cover must be opened prior to opening the second cover.

15. The system according to claim 14, wherein the supply body covers are screens.

* * * * *